United States Patent [19]

Feroy

[11] 4,076,453
[45] Feb. 28, 1978

[54] BEARING RING FOR BLADE OF A CONTROLLABLE PITCH PROPELLER

[76] Inventor: Arne Feroy, 1921 S. 291st St., Federal Way, Wash. 98002

[21] Appl. No.: 589,268

[22] Filed: Jun. 23, 1975

[51] Int. Cl.² .................. F01D 11/08; F04D 29/10; F16C 17/02
[52] U.S. Cl. .................. 416/174; 308/237 R
[58] Field of Search ........... 308/66, 71, 68, 237 R, 308/239; 416/167, 174; 285/92, 421; 151/21 R, 21 C

[56] References Cited

U.S. PATENT DOCUMENTS

| 1,293,435 | 2/1919 | Hjorth | 308/71 |
|---|---|---|---|
| 1,443,534 | 1/1923 | Hoblit | 308/66 |
| 1,477,622 | 12/1923 | Aab | 308/66 |
| 1,484,878 | 2/1924 | Flaherty | 308/70 |
| 1,695,776 | 12/1928 | Nemec | 308/237 R |
| 1,750,554 | 3/1930 | Walter | 308/237 R |
| 2,699,221 | 1/1955 | Nichols | 416/167 |
| 2,794,508 | 6/1957 | Pehrsson et al. | 308/167 |
| 3,393,749 | 7/1968 | Feroy | 416/167 |

FOREIGN PATENT DOCUMENTS

| 1,029,001 | 5/1953 | France | 308/239 |

Primary Examiner—Everette A. Powell, Jr.
Assistant Examiner—Thomas I. Ross
Attorney, Agent, or Firm—Christensen, O'Connor, Garrison & Havelka

[57] ABSTRACT

In a controllable pitch propeller assembly, a threaded and split bearing ring engages an internally threaded radial bore in the hub of the assembly. A plug for expanding the bearing ring is provided to interlock the threads of the ring with those of the radial bore in the hub.

5 Claims, 7 Drawing Figures

BEARING RING FOR BLADE OF A CONTROLLABLE PITCH PROPELLER

BACKGROUND OF THE INVENTION

This invention relates to controllable pitch propeller assemblies and, more particularly, to bearings for journaling the propeller blades within the propeller hub.

The blades and their bearing support in the propeller hub of controllable pitch propeller assemblies are subjected to extremely high loading. This loading is the result of centrifugal forces which tend to move the blades outwardly during rotation, and of the axial forces caused by the thrust on the blades. The loading on the blades is transferred to the blade roots in the propeller hub where bearings are provided to permit turning motion of the blades. In order to support the loading on the blades with a minimum of deflection of the bearing support members, the bearing must be rigidly fixed to the propeller hub, yet have sufficient clearance to allow the necessary turning motion of the blades.

It is known to provide a controllable pitch propeller with a bearing support for the blades that includes a liner or sleeve positioned within bored radial holes in the propeller hub that journals the blades to support the rotating motion of the blades and bearing rings on the outer and inner ends of the bore to support the bending and radial loads on the blade. This type of bearing support requires many parts with closely machined tolerances in order to achieve the necessary support and to eliminate the slack caused by the cumulative tolerances of the parts. Moreover, such a bearing support requires that the propeller hub be machined on its inner surface where the inboard bearing ring is placed, and further that all the bearing parts be fixed to the hub by keys or other means.

Another known bearing arrangement includes a bearing ring, having threads on its outer circumferential surface that engage corresponding internal threads in a bore in the hub. In this arrangement, the threaded ring is secured or seated against a shoulder in the bore. Since the threads in this type of bearing are preloaded in one direction only when the ring is tightened against the shoulder, the ring has a tendency to work itself loose even when keyed or pinned.

The principal object of this invention is to provide a simplified bearing support for the blades of a controllable pitch propeller assembly that includes a threaded connection to the propeller hub and that is solidly locked to the hub.

Another object is to provide a bearing whose radial position in the propeller hub is easily adjusted to compensate for inaccuracies in machining or cumulative buildup of tolerances of the various parts.

Another object is to provide a bearing for the blades that is easily installed or removed, that permits easy assembly of the parts, and that does not require any machining work to be performed on the inside surface of the propeller hub.

A further object is to provide a bearing for the blades in a controllable pitch propeller assembly that has fewer parts than prior art bearings, that is of practical, durable and compact construction, and that is simple and inexpensive to manufacture.

SUMMARY OF THE INVENTION

The foregoing objects, and other objects that will become apparent to one of ordinary skill in the art after reading the following specification, are provided in a controllable pitch propeller assembly including a hub, a plurality of propeller blades radiating from the hub, and means for turning each of said blades. The improvement for journaling each of the propeller blades in the hub comprises an annularly-shaped bearing ring having external threads thereon and having a radial gap therein. The hub has an internally threaded radial bore at the location of each of the propeller blades for receiving the bearing ring in threaded engagement. A means is operably associated with the gap in the ring for expanding the ring to interlock the threads on the bearing ring with the threads of the radial bore.

BRIEF DESCRIPTION OF THE DRAWINGS

A better understanding of the present invention can be derived from reading and ensuing specification in conjunction with the accompanying drawings wherein.

DESCRIPTION OF PREFERRED EMBODIMENTS

Figure 1:
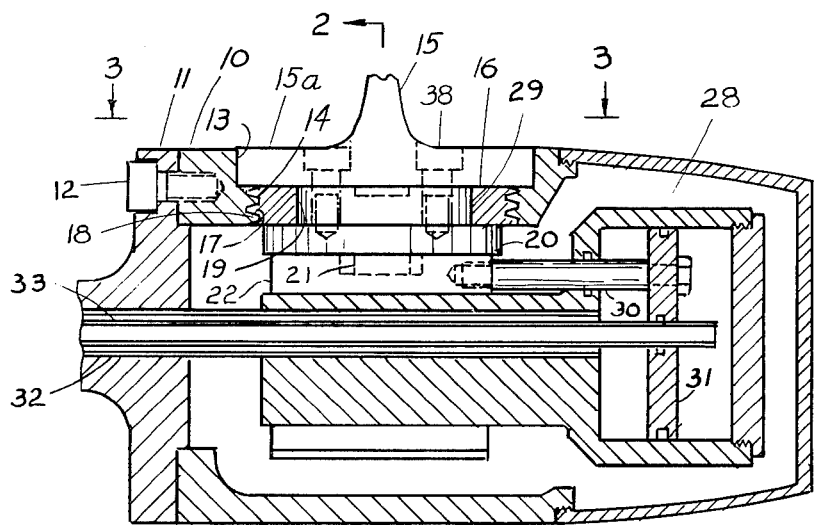
FIG. 1 is a longitudinal section of a controllable pitch propeller hub employing the bearing ring of the present invention.
Figure 2:
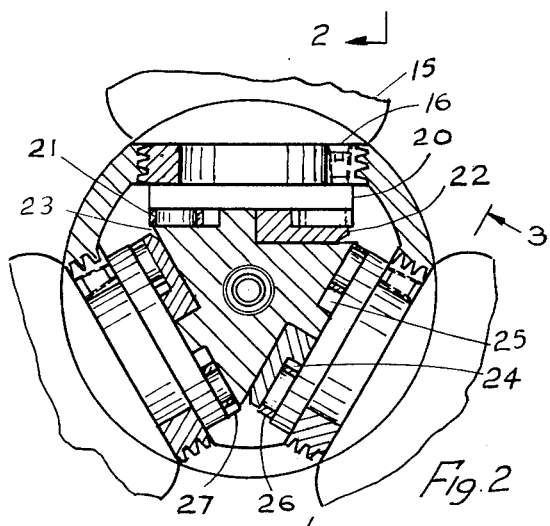
FIG. 2 is a transverse section of FIG. 1 taken along section line 2—2 of FIG. 1.
Figure 3:
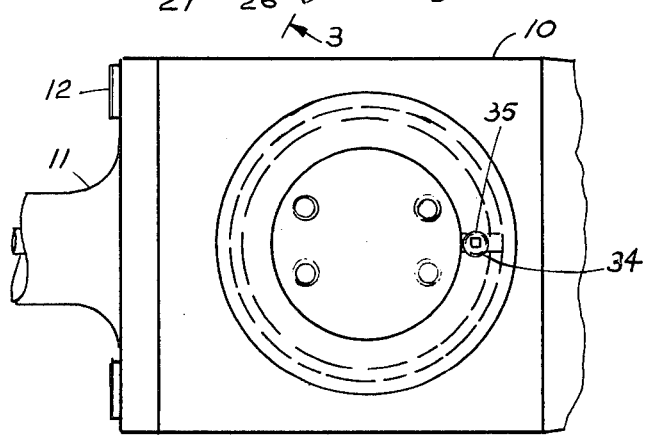
FIG. 3 is a plan view taken along section line 3—3 of FIG. 2 with the propeller blades omitted.

Referring to FIGS. 1, 2 and 3, the invention will be described in relation to a single propeller blade rotatably mounted in a propeller hub. It is to be recognized that each of a plurality of propeller blades associated with a given hub can be mounted in a similar or identical manner. The propeller hub 10 is bolted to the shaft 11 by capscrews 12. Propeller hub 10 is provided with a first radial bore 13 and a smaller concentric bore 14 that receive the base 15a of the propeller blade 15 and bearing ring, 16 respectively. Bearing ring 16 is provided with external threads 17 on its outer circumferential surface that mesh with corresponding internal threads 18 in smaller radial bore 14. Bearing ring 16 has an axial bore 19. The bore 19 receives the outwardly extending cylindrical portion 29 of the flange 20, which is attached to the base of the blade 15 by bolts 38.

Two crankpins 21 extend inwardly from the inner surface of flange 20. Crossheads 22 and 23 are slidable on the inner surface of flange 20 and carry outwardly opening slots 24 and 25, respectively.

Sliding block 26 is pivoted on one of the crankpins 21 of flange 20 and is slidably mounted in slot 24 of crosshead 22. Sliding block 27 is pivoted on the other crankpin 21 of flange 20 and is slidably mounted in slot 25 of crosshead 23, which also serves as the forward end of cylinder 28. Bolt 30 is slidably mounted in the wall of cylinder 28 and connects crosshead 22 to piston 31, reciprocally mounted in cylinder 28. Oil tubes 32 and 33, mounted concentrically within the hub, are coupled to cylinder 28 and have fluid outlets to the forward and aft portions, respectively, of cylinder 28. The tube 33 is slidably mounted through the center of piston 31.

Figure 5:
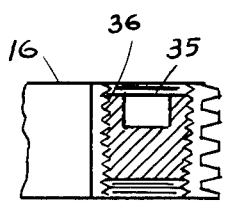
FIG. 5 is a radial sectional view of the bearing ring and of the locking insert taken along section line 5—5 of FIG. 4.
Figure 4:
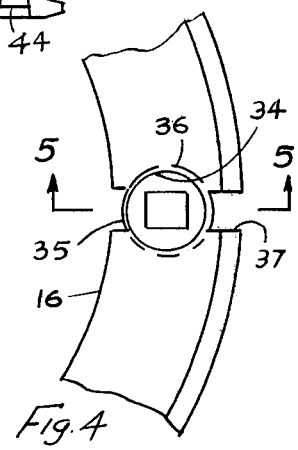
FIG. 4 is an enlarged detail view of the bearing ring showing the radial gap.

Referring to FIGS. 3 through 5, bearing ring 16 is provided with a tapered hole or bore 34 that receives a tapered insert 35. Both hole 34 and insert 35 have mating and tapered threads 36. Bearing ring 16 is further provided with a slot or gap 37 that cuts the bearing ring radially and intersects the hole 34.

In operation, fluid in lines 32 or 33 is directed to one side of piston 31 causing cylinder 28 to move in one direction and piston 31 to move in the opposite direction. Cylinder 28 (being connected by crosshead 23 and sliding block 27 to one crankpin 21 of each flange 20), and piston 31 (being connected by bolt 30, crossheads 22, and sliding block 26 to the other crankpin 21 of each flange 20) coact to rotate flanges 20 and propeller blades 15 to control the pitch of the propeller from full ahead to full astern and vise versa.

During assembly the propeller head 10 is positioned with its rotational axis oriented vertically. Cylinder 28, piston 31 and crosshead 23 are placed into the propeller hub through the end of the hub. Sliding blocks 26 and 27 are placed in their respective slots of the crossheads through bores 13, 14 in the hub. Flange 20 is also inserted through bores 13, 14 with crankpins 21 placed into sliding blocks 26 and 27. Thereafter, bearing ring 16 is threaded into the threads of bore 14, while bore 19 of bearing ring 16 slides over cylindrical portion 29 of flange 20.

The base 15a of blade 15 and flange 20 are joined by bolts 38 to form a solid assembly. Cylindrical part 29 of flange 20 is journaled in bore 19 of bearing ring 16 and is provided with an axial length slightly more than the corresponding thickness of bearing ring 16 to insure correct radial clearance between the blade-flange assembly and the bearing ring.

The bearing ring 16 is positioned radially in the hub to properly locate the internal parts of the hub relative to the center of the hub, and to insure the correct radial clearance between the internal parts of the propeller assembly. Radial adjustment of the clearance is accomplished by threading bearing ring 16 inwardly or outwardly as need be to decrease or increase the clearance.

After being radially positioned, bearing ring 16 is locked to the propeller hub 10. To lock the bearing ring in position, threaded insert 35 is threaded into hole 34 of bearing ring 16. Since insert 35 and hole 34 are both provided with tapered threads the bearing ring expands upon tightening of insert 35. As the ring is expanded, both sides of the threads 17 on bearing ring 16 are wedged against the corresponding sides of the internal threads of the bore 14 in the propeller hub, thus forming a locked and solid bearing support for the blades.

Figure 6:
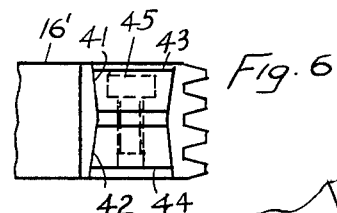
FIGS. 6 and 7 are radial sectional views of alternate locking inserts and the bearing rings with which they are used.

FIG. 6 shows an alternate means for expanding the bearing ring 16' after it is threaded into and radially positioned within its radial bore in the hub of the propeller assembly. In this embodiment, ring 16' is provided with two mutually aligned, tapered bores 41 and 42 that extend inwardly from the respective outer and inner surfaces of the ring. Smooth walled, tapered inserts 43 and 44 are positioned in bores 41 and 42, respectively, and are drawn toward each other by a bolt 45. The bolt 45 is inserted through a central bore in insert 43 and threaded into a threaded bore in insert 44. As the bolt 45 is tightened, the inserts bear against respective sides of the bores 44 and 43, expanding the ring 16 and locking it to the hub.

Figure 7:
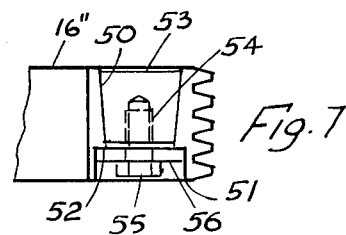

FIG. 7 is another alternate means for expanding the ring 16". In this embodiment, the ring is provided with a single tapered bore 50 extending into the ring and being intersected by the gap. A circular recess 51 aligned with the bore 50 is provided in the opposite surface of the ring 16". The diameter of the recess is larger than the diameter of the bottom of the bore so that an outwardly facing shoulder 52 is formed. A tapered insert 53, provided with a central threaded bore 54, is positioned in the tapered bore 50. A bolt 55, carrying a washer 56 that abuts the shoulder 52 is threaded into the insert 53. As the bolt is tightened, the insert is caused to bear against the walls of the bore 50, thereby expanding the ring 16".

Insert 35, FIGS. 1–5, is described and illustrated as being tapered and having threads. Insert 35, therefore can have a conical shape with a circular cross section. Inserts 43, 44 and 53 are also described and illustrated as being tapered. These inserts, however, may have any cross-sectional shape (section) as long as it conforms to and matches the corresponding tapered bores in the bearing ring 16. Such cross sections may be, for example, (1) circular, the insert being cone shaped, (2) square, quadrangular or rectangular, the insert being of a tetragonal form, (3) a combination of (1) and (2), or (4) any other convenient shape that is easily formed. In addition any means can be employed that will exert mutually opposing forces on the sides of the radial gap or slot to cause the gap to widen and thereby expand the ring.

The present invention has been described in relation to several embodiments. One of ordinary skill will be able to make various changes and substitutions to the invention without departing from the disclosed concepts. It is intended that the protection afforded by patent be limited only by the definition contained in the appended claims.

What is claimed is:

1. In a controllable pitch propeller assembly including a hub having a rotational axis, a plurality of propeller blades radiating from said hub, and means for turning each of said blades about a substantially radial rotational axis relative to the rotational axis of said hub, an improvement for journaling each of said blades in said hub comprising:

an annularly-shaped bearing ring having external threads thereon, said bearing ring having a radial gap therein, said hub having a radial bore and internal threads in said radial bore for receiving said bearing in threaded engagement, and means operably associated with said gap for expanding said bearing ring to interlock said threads on said bearing ring with the threads in the radial bore of said hub, said threads on said bearing ring and said threads in the radial bore of said hub being constructed and oriented relative to each other so that when said bearing ring is expanded both sides of the threads on said ring are wedged against the corresponding threads in said bore to form a locked and solid bearing support for each of said blades.

2. The propeller assembly of claim 1 wherein said means for expanding said bearing ring comprises:

a tapered member, said ring having a tapered bore therein oriented substantially parallel to said radial axis, said tapered bore being intersected by said gap, said tapered member and bore being constructed and oriented relative to each other such that when said tapered member is moved axially within said tapered bore, said tapered member will bear upon said tapered bore and exert lateral forces on said ring thereby widening said gap and expanding said ring, and means for securing said tapered member in said tapered bore.

3. The propeller assembly of claim 2 wherein said means for securing comprises external threads on said tapered member and internal threads within said tapered bore.

4. The propeller assembly of claim 2 wherein said bearing ring has an inner and outer surface said means for expanding said bearing ring further comprising:

a second tapered member, said ring having a second tapered bore coaxially aligned with the first tapered bore, said tapered bores being mutually inwardly tapering from opposite ones of the inner and outer surfaces of said bore, said second tapered member and said second tapered bore being so constructed and oriented in relation to each other and in relation to the other tapered member and bore so that when said tapered members are mutually advanced toward each other, they will bear upon the respective tapered bores to exert lateral forces on said ring thereby widening said gap and expanding said ring.

5. The propeller assembly of claim 1 wherein said bearing ring is radially adjustable relative to said hub, said internal and external threads being constructed for interlocking engagement independent of the radial position of said ring relative to said hub.

* * * * *